United States Patent
Tanaka et al.

[11] Patent Number: 5,938,236
[45] Date of Patent: Aug. 17, 1999

[54] GAS GENERATOR FOR AN AIR BAG

[75] Inventors: Koji Tanaka; Takashi Saso; Ken-ichi Nagahashi; Seigo Taguchi, all of Himeji, Japan

[73] Assignees: Nippon Kayaku Kabushiki-Kaisha, Tokyo, Japan; Kabushiki Kaisha Kobe Seiko Sho, Kobe, Japan

[21] Appl. No.: 09/029,861
[22] PCT Filed: Jul. 4, 1997
[86] PCT No.: PCT/JP97/02338
  § 371 Date: Apr. 6, 1998
  § 102(e) Date: Apr. 6, 1998
[87] PCT Pub. No.: WO98/02336
  PCT Pub. Date: Jan. 22, 1998

[30] Foreign Application Priority Data

Jul. 17, 1996 [JP] Japan ................................. 8-207930

[51] Int. Cl.⁶ .................................................. B60R 21/28
[52] U.S. Cl. ........................ 280/741; 280/736; 102/531
[58] Field of Search .................................. 280/740, 736, 280/741, 742; 102/530, 531

[56] References Cited

U.S. PATENT DOCUMENTS

| | | | |
|---|---|---|---|
| 5,419,578 | 5/1995 | Storey et al. | 280/741 |
| 5,582,427 | 12/1996 | Rink et al. | 280/740 |
| 5,613,705 | 3/1997 | Hock et al. | 280/741 |
| 5,643,345 | 7/1997 | Cox et al. | 55/385.3 |
| 5,712,595 | 1/1998 | Mooney et al. | 280/741 |

FOREIGN PATENT DOCUMENTS

| | | | |
|---|---|---|---|
| 3742383 | 6/1989 | Germany | 280/736 |

*Primary Examiner*—J J Swann
*Assistant Examiner*—Lynda Jasmin
*Attorney, Agent, or Firm*—Oblon, Spivak, McClelland, Maier & Neustadt, P.C.

[57] ABSTRACT

A gas generator for air bags including a housing (3) defined by a side cylinder (1b) having a plurality of gas outflowing holes (10) and an upper cover (1a) and a lower cover (2a) for closing ends of the side cylinder (1b); an igniter (4), a gas generating agent (6) and a cooling filter member (8) disposed in this order in the housing (3) from a center thereof toward a radially outward side thereof; and a metallic foil (11) disposed on an inner wall surface of the side cylinder (1b) to cover the gas outflowing holes (10) from inside. The cooling filter member (8) extends from the upper cover (1a) to the lower cover (2a). The cooling filter member (8) is cylindrical in shape and has a thick walled portion (8a) formed on an outside diameter side on an end axially opposite to the gas outflowing holes (10), and the thick walled portion (8a) is press fitted into an inner surface of the housing (3).

13 Claims, 7 Drawing Sheets

8

8

GAS GENERATOR FOR AN AIR BAG

BACKGROUND OF THE INVENTION

1. Field of the Invention

The present invention relates to a gas generator used for an air bag safety system for assuring safety of a driver and passengers of a car from shock caused by car crash. Specifically to a gas generator for air bags (hereinafter referred to simply as a "gas generator") whose number of parts may be reduced and whose production cost may be lowered without impairing its performance as a gas generator.

2. Discussion of Background

As a gas generator of this sort, there has been one disclosed in Japanese Patent Application No. Hei. 7-333902 applied by the present applicant for example. As shown in FIG. 7, this gas generator has an upper container 101 made from aluminum having a double piped structure whose one end (upper end in the figure) is closed and a lower container 104 made from aluminum having a double short piped structure having an opening at the axial center part thereof. Then, they are friction welded by respectively butting edges of inner cylindrical walls 102 and 105 and edges of outer cylindrical walls 103 and 106 of the upper container 101 and the lower container 104. Accordingly, this gas generator has a housing structure in which a center spatial section and a ringed spatial section around that are created.

An ignition chamber P is created at the center spatial section by charging a squib 118 and enhancer 119 from the bottom. A retainer ring 116 is disposed and fixed within the ringed spatial section. An inner peripheral edge portion 116d and an outer peripheral edge portion 116e of the retainer ring 116 abut respectively with friction welding burrs 102b and 103b of the upper container 101. Then, gas generating agents 107 and a cooling member/filtering member (hereinafter referred to as a "cooling filter member") 110 are stored within the ringed spatial section interposed between the upper container 101 and the retainer ring 116. A combustion chamber G and a filtering chamber F are created by storing the gas generating agents 107 and the cooling filter member 110 radially in order from the inside.

Such a gas generator has an advantage that because its housing is jointed by friction welding the inner pipes and the outer pipes of the double pipes respectively from each other, reliability of joint strength is very high and the safety of the gas generator may be enhanced. Further, the friction welding has an advantage that it requires no expensive welding facility and its production cost can be lowered.

However, the friction welding method has had a problem that it is difficult to control height of welding in general. A special care is required especially when the gas generating agent which is one of propellants is charged inside such as the gas generator. When the height cannot be fully controlled for example, a phenomenon of that a lower cover 121 of the lower container 104 contacts with the cooling filter member 110 and the cooling filter member 110 rotates together with the lower container 104 occurs while rotating the lower container 104 in friction welding. That is, a phenomenon of so-called co-rotation occurs. When such a situation occurs, the gas generating agent 107 is rubbed by the inner face of the cooling filter member 110. As a result, there is a possibility that the gas generating agent is fired and explodes in the worst case depending on the type of the gas generating agent and the environment such as use temperature of the gas generator and it is very dangerous.

It is then necessary to facilitate the control of the height during the friction welding by assuring a clearance 140 between the cooling filter member 110 and the lower cover 121 of the lower container 104 in order to avoid such a situation from occurring. Then, because such clearance 140 is provided, it is necessary to maintain air-tightness of the combustion chamber G so that slag within combustion gas would not flow out of the end of the cooling filter member 110 when such gas generator is operative. From such necessity, the retainer ring 116 is disposed as an essential member so that the performance of the gas generator is not impaired.

However, in the present situation where air bag systems are being mounted as standard in vehicles, it has become an urgent requirement to lower the cost of the gas generator. Then, attaching much importance to that it is effective to reduce a number of parts to reduce the production cost, the inventors et. al. have studied ardently from such a point of view. As a result, the inventors have consummated the present invention.

SUMMARY OF THE INVENTION

Accordingly, it is an object of the present invention to provide a gas generator which is less expensive because it has no retainer ring. The gas generator allows the height to be controlled readily during friction welding even without the retainer ring which has been considered to be an essential part without impairing the performance of the gas generator which is less expensive because it has no retainer ring.

The present invention pertains to a gas generator in which the disposition of a cooling filter member within a housing is modified so that the same function with that which has been played by the retainer ring of preventing slag from the cooling filter member from flowing out can be exhibited while maintaining a clearance for controlling the height between an upper or lower cover during the friction welding.

DISCLOSURE OF INVENTION

The inventive gas generator for emitting gas for inflating an air bag comprises a side cylinder having a plurality of gas outflowing holes; an upper cover and a lower cover for covering both ends of the side cylinder, respectively; and a cooling filter member stored within the side cylinder closed by the upper cover and the lower cover in order to cool generated gas and to remove slag within the gas. The cooling filter member is a cylindrical member which creates a predetermined space between an outer peripheral face thereof and an inner peripheral face of the side cylinder, its upper end abuts on the upper cover and its lower end abuts on the inner peripheral face of the side cylinder while having a thick wall portion which can be press fitted within the side cylinder.

In such gas generator, air-tightness at the face where the outer peripheral face of the cooling filter member abuts on the inner face of the side cylinder and the face where the upper end portion of the cooling filter member abuts on the inner face of the upper cover is enhanced even without a retainer ring by press fitting the thick wall portion of the cooling filter member to the inner peripheral face of the side cylinder. Therefore, no slag in combustion gas flows to the outside from a clearance between the outer peripheral face of the cooling filter member and the inner peripheral face of the side cylinder or from a clearance between the upper end portion of the cooling filter member and the inner face of the upper cover, causing no problem in terms of its performance. Thus, it becomes possible to lower the cost of the gas generator by reducing a number of parts.

Further, the cooling filter member is desirable to be a molded body of crimped metallic wires or a molded body of knitted metallic mesh. The "crimped" means to bend a thin wire rod into a wavy or coil shape. The molded body obtained by compressing after reeling the bent wire rods obtained by the crimping or the molded body obtained by compressing the knitted mesh of metallic wires presents a minute mesh structure having a full of compression restitution. When the thick wall portion of the cooling filter member composed of such mesh structure is press fitted to the inner peripheral face of the side cylinder, the mesh structure which has become minute even more by its compression restitution strongly presses the inner peripheral face of the side cylinder, enhancing the air-tightness of the cooling filter member as a result. Still more, because such cooling filter member may be obtained simply from generally used wire rods, it allows the production cost of the gas generator to be lowered further. When the cooling filter member is the molded body of the knitted metallic mesh, the assembly work may be simplified because it may be obtained just by laminating and press molding the metallic knitted mesh which are readily available.

It is also preferable to form the thick wall portion which is capable of abutting on the outer peripheral face of the cooling filter member on the inner peripheral face of the side cylinder near the upper cover.

The thick wall portion of the side cylinder allows a space which is uniform along the circumferential direction to be assured between the inner peripheral face of the side cylinder and the outer peripheral face of the cooling filter member. As a result, a restricting effect of the gas by the gas outflowing holes is suppressed and then the gas flows through the cooling filter member readily in average. Therefore, it allows the utility factor of the cooling filter member to be improved and contributes in the advancing the miniaturization and lightening of the gas generator.

For one embodiment of the inventive gas generator for air bag, the lower cover is provided with a stepped portion at the edge and inside thereof and the lower end of the side cylinder is joined to the stepped portion by friction welding. In this case, the stepped portion of the lower cover allows a clearance between the cooling filter member and the lower cover to be assured and to prevent a phenomenon of co-rotation during friction welding from occurring.

Further, fixing the thick wall portion of the cooling filter member by the burr formed during the friction welding allows the contact and fixation at the face where the inner peripheral face of the side cylinder abuts on the thick wall portion of the cooling filter member to be made more reliable. Accordingly, the effect of preventing slag from the cooling filter member to the outside is made more reliable.

Further, it is possible to dispose a metallic cylinder having a number of holes or a mesh screen in the predetermined space created between the inner peripheral face of the side cylinder and the outer peripheral face of the cooling filter member.

In this case, even if the cooling filter member goes to deform in the radial direction by the gas pressure which is generated and flows out when the gas generator is operative, the cooling filter member is suppressed from deforming in the radial direction by disposing the porous metallic cylinder or the mesh screen. Therefore, because the cooling filter member does not move (deform) in the radial direction, the air-tightness at the face where the inner peripheral face of the side cylinder abuts on the thick wall portion of the cooling filter member is fully assured and the utility factor of the cooling filter member is improved because the gas is dispersed. As a result, the gas generator may be miniaturized and lightened further.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings wherein:

FIGS. 2(a) and 2(b) show a knitted mesh as a cooling filter member of the present invention, wherein FIG. 2(a) is an outside view of the knitted mesh as the member and FIG. 2(b) is a perspective view showing a workpiece of the knitted mesh press-molded in to a cylindrical shape;

DESCRIPTION OF THE PREFERRED EMBODIMENTS

Figure 1:
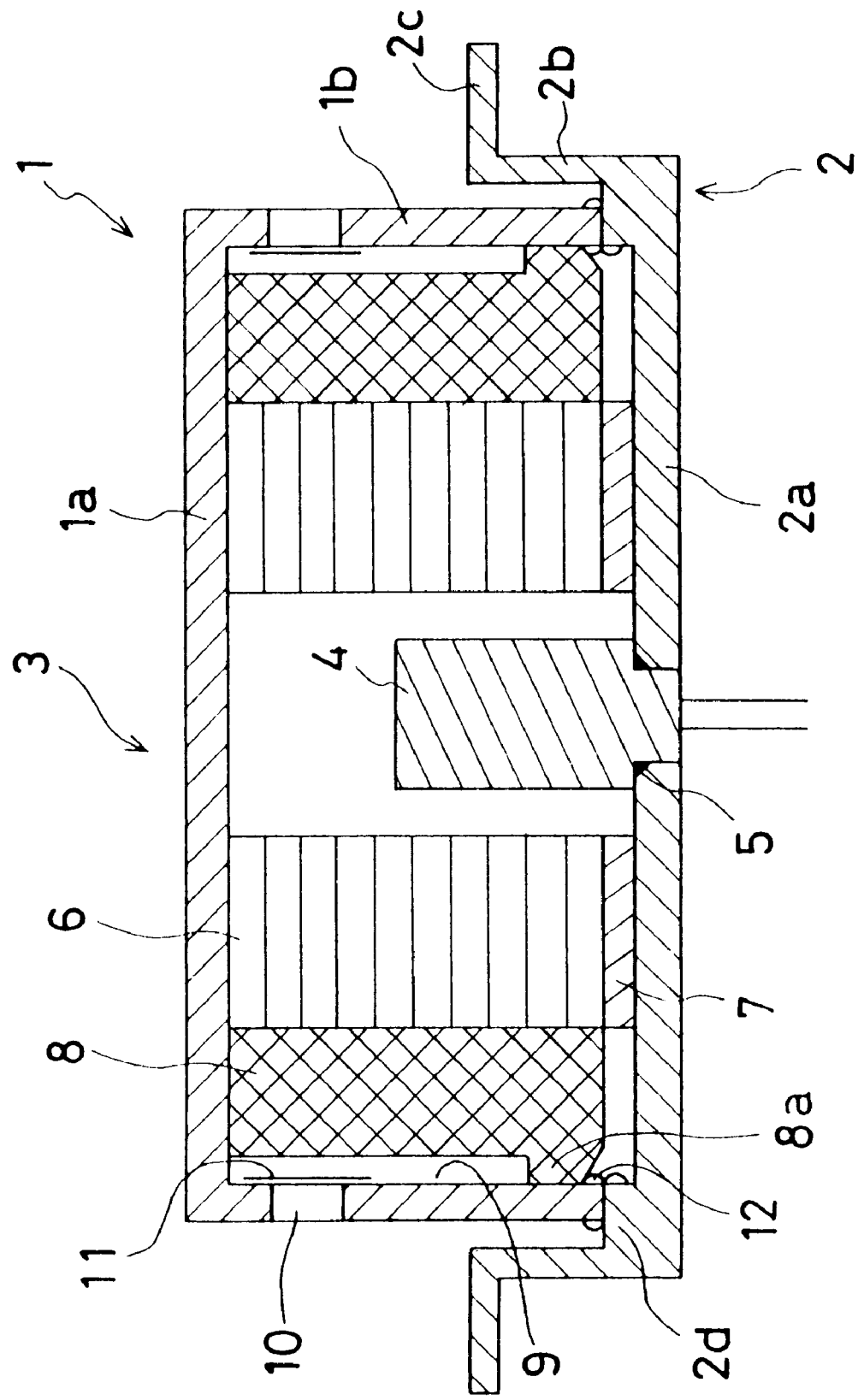
FIG. 1 is a schematic section view showing one embodiment of the present invention.

Referring now to the drawings, wherein like reference numerals designate identical or corresponding parts throughout the several views, and more particularly to FIG. 1 thereof, there is illustrated a schematic section view showing one embodiment of the present invention. In FIG. 1, the reference numeral 1 denotes an upper container, 2 a lower container and 3 a housing.

The upper container 1 made from aluminum has an upper cover 1a and a side cylinder 1b formed so as to hang down from the peripheral edge portion of the upper cover 1a. A plurality of gas outflowing holes 10 are formed at the upper part of the side cylinder 1b in the circumferential direction.

The lower container 2 is made from aluminum and has a lower cover 2a, a stepped portion 2d formed at the inside of the edge of the lower cover 2a, a cylindrical first flange portion 2b which rises from the stepped portion 2d so as to surround the side cylinder 1b of the upper container 1 and a second flange portion 2c which protrudes vertically from the edge of the first flange portion 2b. Then, the lower edge of the side cylinder 1b of the upper container 1 is friction welded to the stepped portion 2d of the lower cover 2a of the lower container 2, thus creating the housing 3.

The stepped portion 2d of the lower cover 2a is provided to prevent a phenomenon of co-rotation from occurring during the friction-welding together with a thick wall portion 8a of a cooling filter member 8 described later by assuring a clearance between the cooling filter member 8 and the lower cover 2a of the lower container 2.

An igniter 4 is fixed at the center via a seal 5 within the housing 3. Gas generating agents 6 are charged around the igniter 4 from the upper cover 1a to the lower cover 2a. An elastically cushion member 7 is provided between the gas generating agent 6 and the lower cover 2a. The gas generating agent 6 is fixed within the housing 3 by the cushion member 7. It is noted that an aluminum foil 11 is pasted on the inner peripheral face of side cylinder to cover the gas outflowing holes 10 to prevent the gas generating agent 6 from being affected by moisture together with the seal 5.

The cooling filter member 8 is disposed within the housing 3 so as to surround the periphery of the gas generating agents 6. The cooling filter member 8 is a cylindrical member whose diameter of the outer periphery is smaller than the diameter of the inner periphery of the side cylinder 1b by a predetermined length so as to create a predetermined space between the outer peripheral face thereof and the inner peripheral face of the side cylinder 1b. Its height is also shorter than a distance between the upper cover 1a and the lower cover 2a by a predetermined length. The thick wall portion 8a is created at the outer peripheral face at the lower end thereof. The thick wall portion 8a is press fitted to a face 9 at the inside of the side cylinder 1b composing the housing 3 and abuts on the inner peripheral face at the lower part of the side cylinder 1b. The upper end of the cooling filter member 8 abuts on the upper cover 1a. The reason why it is arranged so that the thick wall portion 8a of the cooling filter member 8 abuts on the inner peripheral face at the lower part of the side cylinder 1b is not to damage a metallic foil seal which is pasted, from the inside, on the gas outflowing holes 10 provided at the upper part of the side cylinder 1b.

The clearance is assured between the cooling filter member 8 and the lower cover 2a of the lower container 2 by the thick wall portion 8a of the cooling filter member 8 press-fitted to the face 9 at the inside of the side cylinder 1b and the above-mentioned stepped portion 2d of the lower cover 2a. Further, because the upper face and the outer peripheral face of the lower part of the cooling filter member 8 are fixed closely to the upper cover 1a and the side cylinder 1b, respectively, so that the cooling filter member 8 is compressed by the upper cover 1a and the side cylinder 1b, slag within the combustion gas will not flow out to the outside via the clearance between the inner wall of the housing 3 and the cooling filter member 8.

Thus, according to the present embodiment, the disposition and arrangement of the cooling filter member 8 within the housing are modified so that the equivalent function of preventing slag from flowing out to the outside from the cooling filter member, which has been played by the retainer ring, may be exhibited while assuring the clearance for controlling the height during pressure welding between the upper or lower cover. Accordingly, the height during the friction welding may be readily controlled without impairing its performance even if the retainer ring which has been considered to be the essential part for preventing the co-rotation is omitted and it becomes possible to provide the less expensive gas generator because it has no retainer ring.

Figure 2:
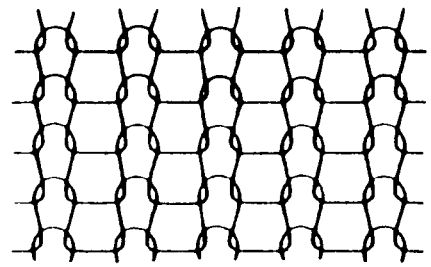
Figure 2:
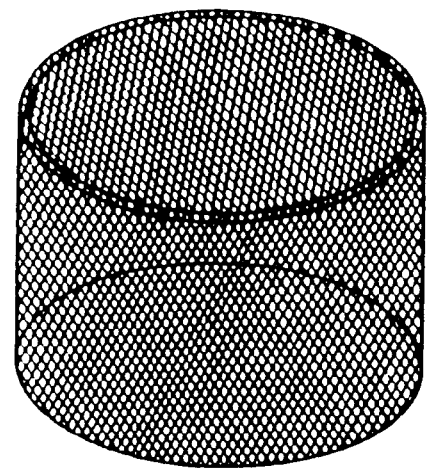

It is noted that as the cylindrical cooling filter member 8, it is preferable to use a member whose air-tightness of the abutting face becomes better by disposing by means of press-fit, i.e. a porous light and strong member having compression restitution in concrete. As an example of such a member, it is advantageous in terms of material and assembly to adopt one created by laminating heat resistant metallic wires of about 0.1 to 1 mm which have been bent into the shape of wave or coil by implementing crimping and then by press-molding into the cylindrical shape or one (see FIG. 2(b)) obtained by press-molding a knitted mesh (see FIG. 2(a)). It may be recommended as a preferable mode because it contributes in lowering the production cost of the gas generator.

It is also possible to enhance the contact and fixation of the face where the housing 3 abuts on the cooling filter member 8 by chamfering the outer peripheral edge at the bottom of the cooling filter member 8 and by abutting and fixing a slanted face thereof with the friction welding burr 12 created in friction welding the side cylinder 1b of the upper container 1 with the lower container 2. Therefore, the effect of preventing slag from flowing out of the cooling filter member 8 may be enhanced further accordingly.

Figure 3:
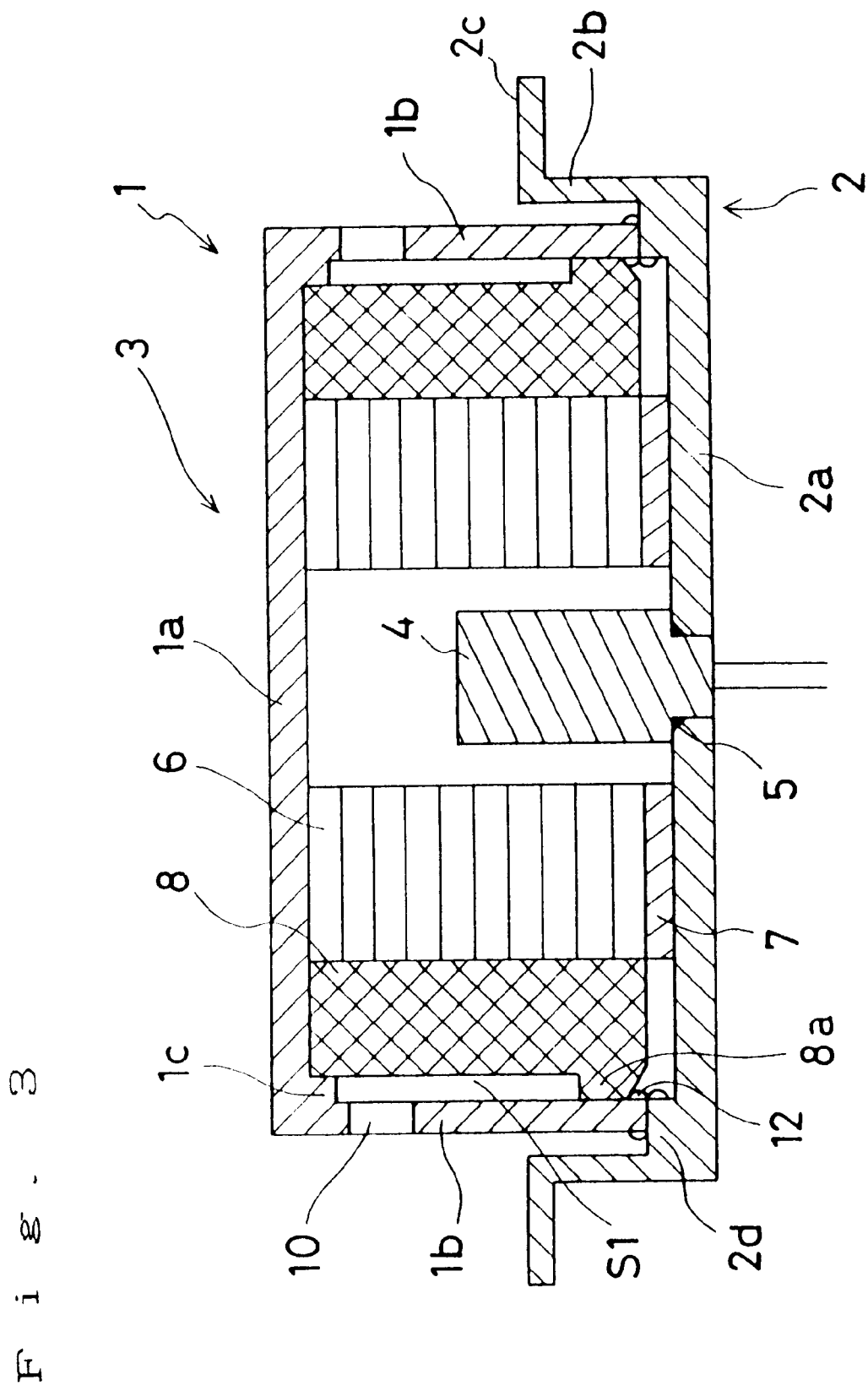
FIG. 3 is a schematic section view showing another embodiment of the present invention.

The second of the embodiment will be explained based on FIG. 3. This embodiment is characterized in that a thick wall portion 1c which abuts with the outer diametric portion of the cooling filter member 8 is formed at the inner diameter side of the side cylinder 1b near the upper cover 1a of the housing 3. The structure other than that is the same with that shown in FIG. 1. The thick wall portion 1c of the side cylinder 1b may be provided locally only at the part of the side cylinder 1b where the gas outflowing holes 10 are provided. However, it is desirable to provide it across the whole inner circumference of the side cylinder 1b in order to assure the contact and fixation.

According to the gas generator of the present embodiment, the thick wall portion 1c which abuts on the outer peripheral face of the cooling filter member 8 is provided near the upper cover 1a, i.e. near the side of the side cylinder 1b where the gas outflowing holes 10 are provided, so that it is possible to reliably assure a space S1 which is uniform along the circumferential direction between the inner face of the housing and the outer face of the cooling filter member 8, especially near the gas outflowing holes 10. Because the space S1 becomes a gas reservoir and its pressure is equalized by assuring the space S1, an influence of a gas flow restricting effect of the gas outflowing holes 10 is lessened and the combustion gas passes through the most of the volume of the cooling filter member 8, thus improving the utility factor of the cooling filter member 8. Therefore, it becomes possible to advance the miniaturization and lightening of the gas generator further.

Figure 4:
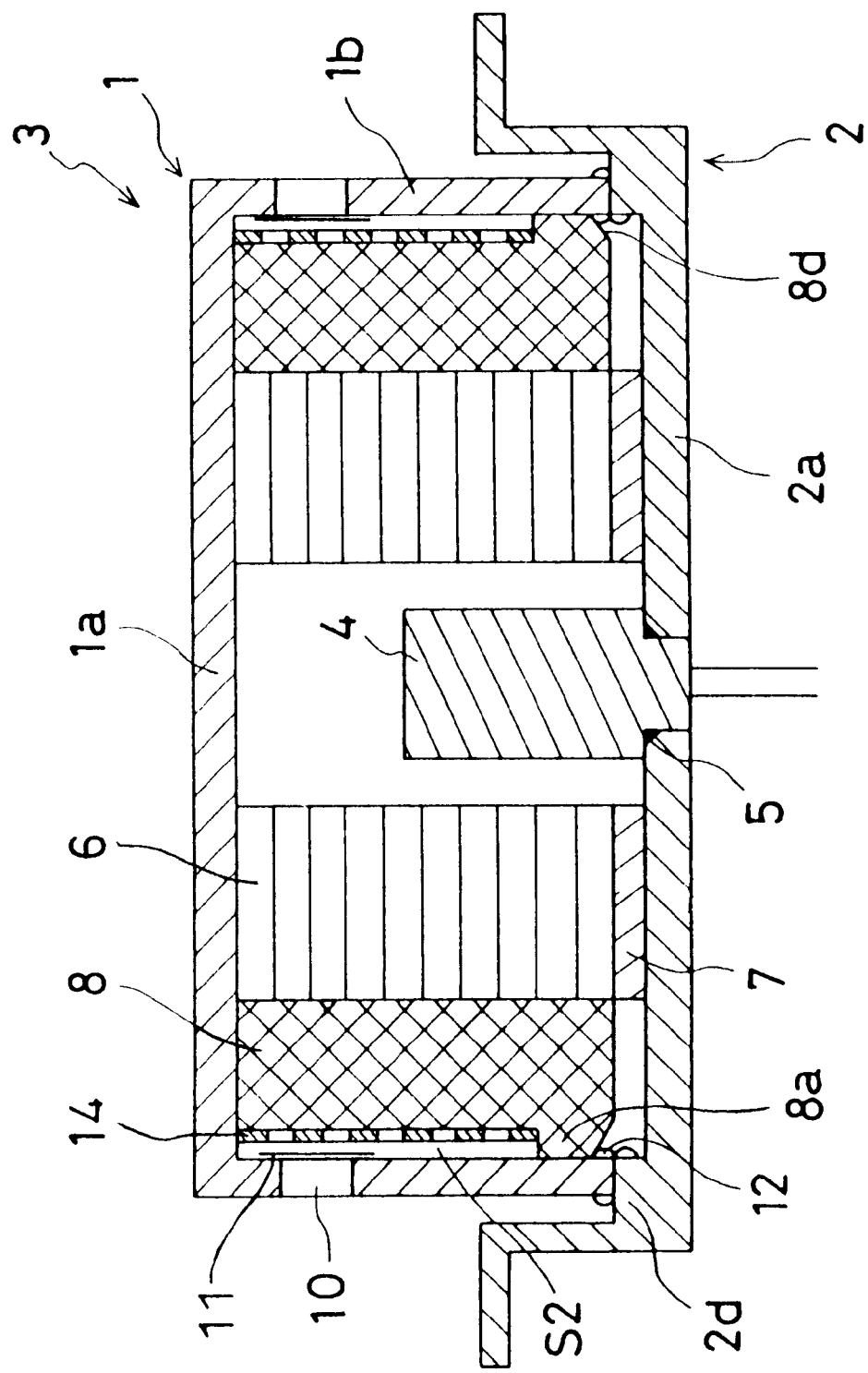
FIG. 4 is a schematic section view showing an example of a gas generator in which a porous metallic cylinder is provided around the outer circumference of the cooling filter member.

The third of the embodiment will be explained based on FIG. 4. As shown in FIG. 4, the present embodiment is characterized in that a metallic cylinder 14 having a number of holes is disposed around the outer circumference of the cooling filter member 8 and in an area other than that of the thick wall portion 8a, i.e. in the above-mentioned predetermined space created by the inner peripheral face of the side cylinder 1b and the cooling filter member 8. The structure other than that is the same with that shown in FIG. 1. Then, even if the cooling filter member 8 goes to deform in the radial direction by pressure of the gas which is generated and flows out when the gas generator is operative, the metallic cylinder 14 exhibits an effect of suppressing it by attaching the metallic cylinder 14 around the outer peripheral face of the cooling filter member 8 facing to the space S2 as shown in the present embodiment. Therefore, the cooling filter member 8 will not move (deform) in the radial direction, the cooling filter member 8 is stabilized and the air-tightness at the abutting face at the inner face of the housing is fully assured. Still more, the utility factor of the cooling filter member 8 is improved further as the gas flow restricting effect of the gas outflowing holes 10 is relaxed because there exists a space S2 and the gas flowing through the cooling filter member 8 is dispersed by adopting the metallic cylinder 14. Therefore, it becomes possible to miniaturize and lighten the gas generator further.

Figure 5:
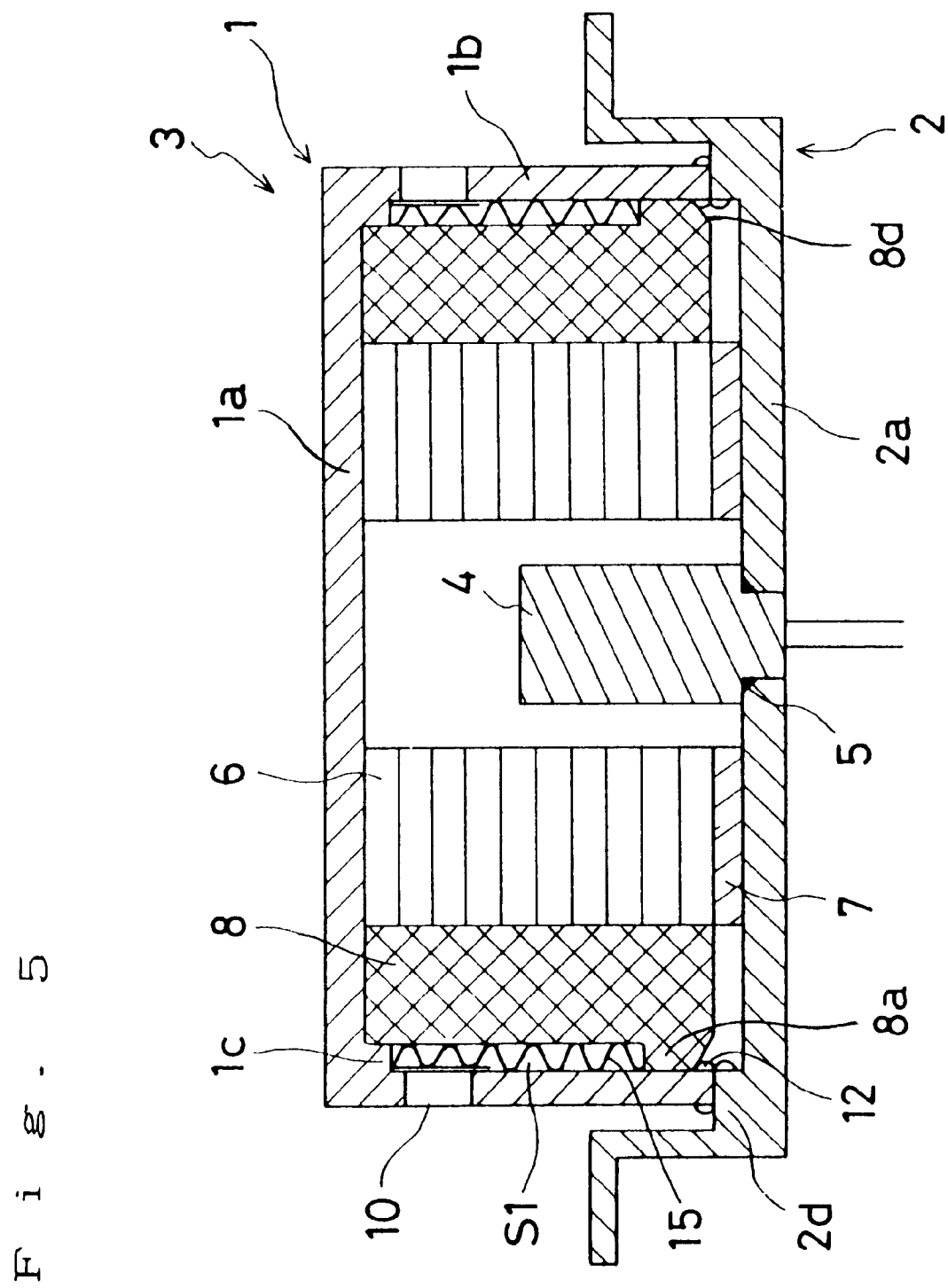
FIG. 5 is a schematic section view showing an example of a gas generator in which a mesh screen is provided around the outer circumference of the cooling filter member.

The fourth of the embodiment will be explained based on FIG. 5. The present embodiment is characterized in that a mesh screen 15 is disposed around the outer circumference of the cooling filter member 8 and in an area other than that of the thick wall portions 8a and 1c, i.e. in the above-mentioned predetermined space created by the inner peripheral face of the side cylinder 1b and the cooling filter member 8. The structure other than that is the same with that shown in FIG. 3. The present embodiment is what may be said as an applied example of the embodiment shown in FIG. 4. The adoption of the mesh screen 15 allows the same effect with the effect of adopting the metallic cylinder 14 to be expected. Still more, because it is very simple to dispose the mesh screen 15 in the space S1 as compared to attaching the metallic cylinder 14 around the cooling filter member 8, it allows an assembling efficiency to be improved and the production cost of the gas generator to be lowered further.

Next, one example of a method for assembling the inventive gas generator will be explained with reference to FIG. 4. At first, after sticking the aluminum foil 11 for closing the gas outflowing holes 10 on the inner peripheral face of the side cylinder 1b of the upper container 1, the upper container 1 is fixed on a predetermined lack so that its opening heads up. Next, the cylindrical cooling filter member 8 around which the metallic cylinder 14 has been wrapped in advance around the outer peripheral face thereof which corresponds to a reduced diameter portion other than the thick wall portion 8a which corresponds to an enlarged diameter portion is inserted from the above (from the bottom in the figure) so that the space S2 is assured on the side of the inner wall face of the side cylinder 1b. Then, the thick wall portion 8a is press fitted within the side cylinder 1b. At this time, it is press fitted so that the chamfered portion 8d at the outer peripheral edge at the bottom face of the cooling filter member 8 reaches to a position at the slightly inside (at the upper position in the figure) from the lower end position of the side cylinder 1b. Next, the ringed gas generating agents 6 are filled along the inner peripheral face of the cooling filter member 8 and the ringed cushion member 7 is laid on the upper face (lower face in the figure) of the uppermost gas generating agent 6.

Then, it is set so that the face of edge of the side cylinder 1b of the upper container 1 into which the gas generating agents 6 and the cooling filter member 8 have been charged and disposed faces and abuts to the upper face of the stepped portion 2d at the outer peripheral part of the lower cover 2a of the lower container 2 into which the igniter 4 has been attached in advance. Then, the lower container 2 is held as against the upper container 1 fixed in this state to press down by a predetermined height while rotating it by predetermined pressure, thus completing the friction welding. At the time of completion, the cooling filter member 8 which has been press fitted and which is a mesh structure having a full of compression restitution is fixed firmly within the housing 3 by the upper cover 1a, the lower cover 2a of the housing 3 and the pressure welding burr 12 and in contact especially at the abutting faces. Thus, the assembly work of the gas generator is finished.

Figure 6:
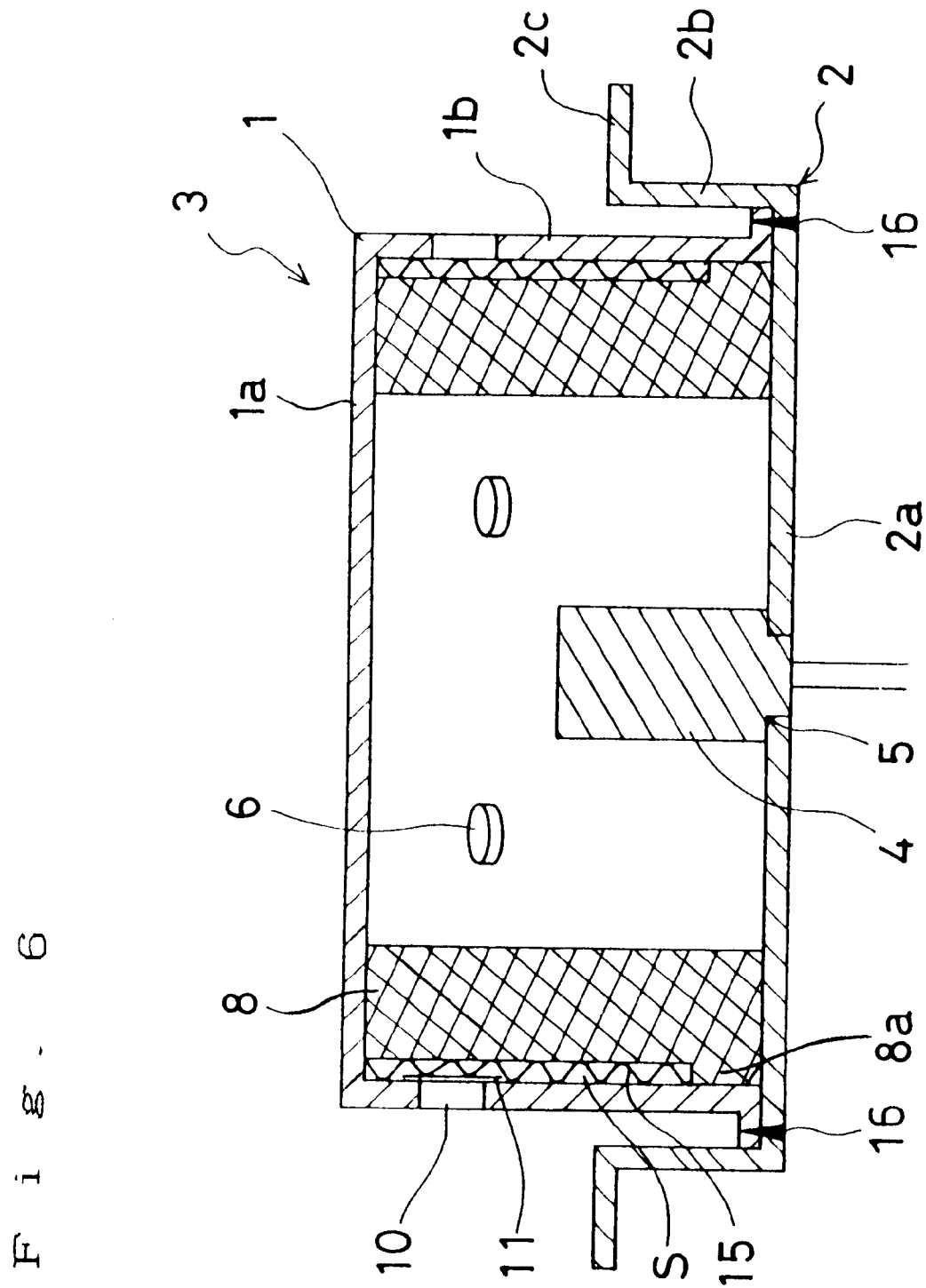
FIG. 6 is a schematic section view showing an example in which the present invention is applied to a gas generator having a welded housing structure.
Figure 7:
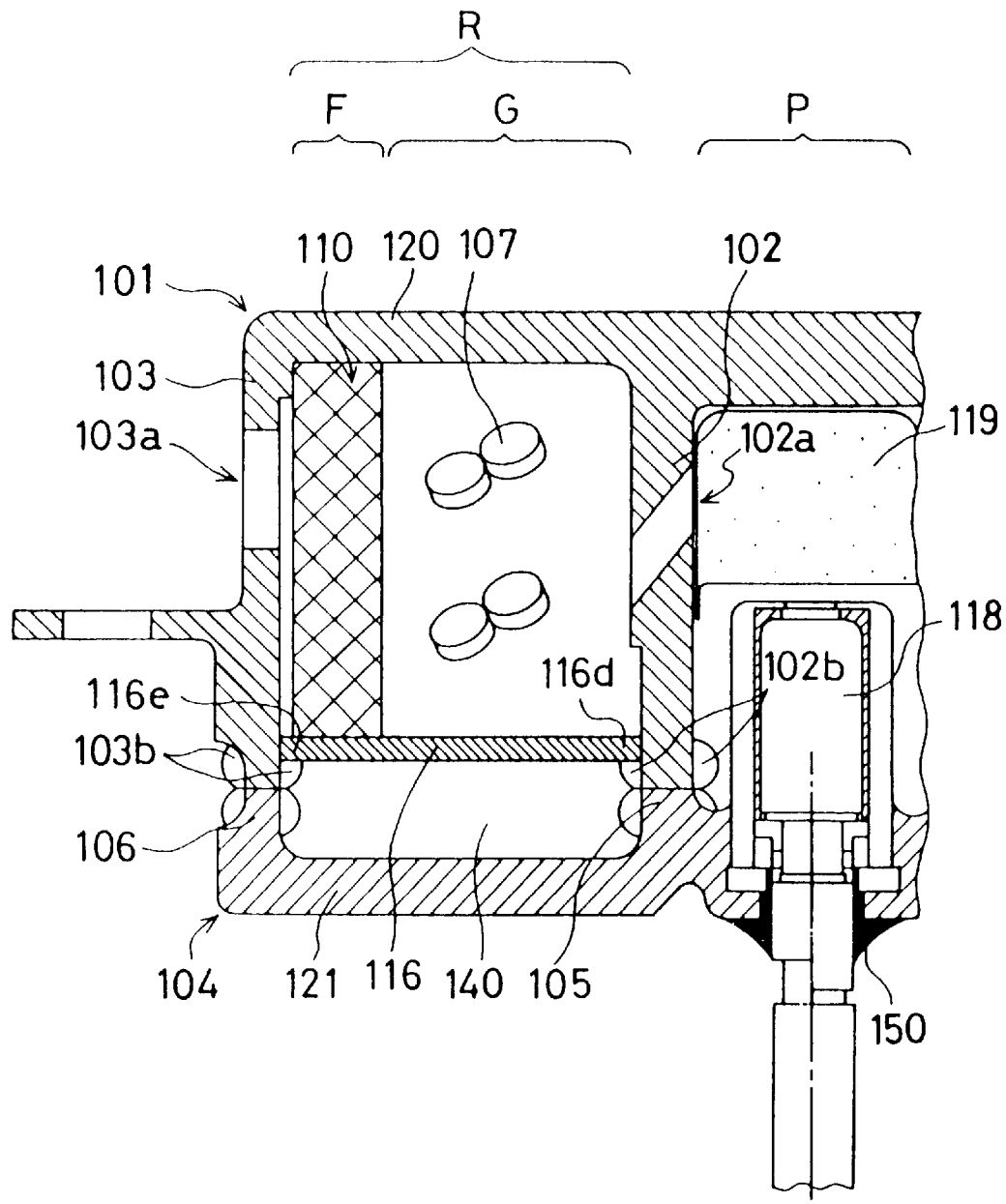
FIG. 7 is a schematic section view showing the gas generator of the preceding example.

It is noted that the means of press fitting, fixing and disposing the cooling filter member which has a full compression restitution of the present invention is also applicable to a gas generator having a welded housing structure as shown in FIG. 6. In assembling it, after press fitting and disposing the cooling filter member 8 in the upper container 1, the lower container 2 is pressed down (pressed up in the figure) to set the lower end face of the side cylinder 1b of the upper container 1 so as to abut with the outer peripheral edge at the inner face of the lower container 2. Then, the portion where the side cylinder 1b overlaps with the lower container 2 is jointed by means of laser welding (the reference numeral (16) denotes the welded spot) for example.

It is noted that although one having the simplex cylindrical structure has been illustrated as the housing structure to which the concept of the press fit and fixation of the cooling filter member may be applied in the description of the above-mentioned embodiment, it is needless to say that it may be also effectively applied to a two-cylinder housing structure having inner and outer ringed side cylinders.

INDUSTRIAL APPLICABILITY

The present invention provides the gas generator which allows the control of height to be readily made during friction welding without impairing the performance as a gas generator even without the retainer ring which has been considered to be an essential member. Then, the less expensive gas generator may be manufactured because of less parts.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gas generator for air bag, comprising:
    a housing defined by a side cylinder having a plurality of gas outflowing holes and an upper cover and a lower cover for closing ends of the side cylinder;
    an igniter, gas generating agents, and a cooling filter member disposed in this order within said housing from a center thereof toward a radially outward side thereof; and
    a metallic foil disposed on an inner wall face of said side cylinder to cover said gas outflowing holes from inside;
    said cooling filter member being substantially interpose between the upper cover and the lower cover;
    said cooling filter member being cylindrical in shape and having a first thick wall portion formed on an outside diameter side on an end axially opposite to said gas outflowing holes, and said first thick wall portion being press fitted into an inner surface of the housing.

2. The gas generator for air bags as described in claim 1, wherein a second thick wall portion which abuts the outer peripheral face of said cooling filter member is formed on the inner diameter side of said side cylinder near said upper cover.

3. The gas generator for air bags as described in claim 1 or 2, wherein said cooling filter member is a molded body of crimped metallic wires.

4. The gas generator for air bags as described in claim 1 or 2, wherein said cooling filter member is a molded body of knitted metallic mesh.

5. The gas generator for air bags as described in claim 1, wherein one of a mesh screen and a metallic cylinder having a number of holes is disposed at the outer peripheral side of said cooling filter member in an area other than said first thick wall portion.

6. The gas generator for air bags as described in claim 2, wherein one of a mesh screen and a metallic cylinder having a number of holes is disposed at the outer peripheral side of said cooling filter member in an area other than said first and second thick wall portions.

7. The gas generator for air bags as described in claim 1 or 2, wherein said housing is constructed by friction welding an upper housing comprising the side cylinder and the upper cover formed in a body with said side cylinder with a lower housing composed of the lower cover and the first thick wall portion formed on the side of the lower cover of the cooling filter member is fixed by a burr formed during the friction welding.

8. A gas generator for emitting gas for inflating air bags, comprising:

a side cylinder having a plurality of gaseous outflowing holes;

an upper cover and a lower cover for covering both ends of said side cylinder, respectively; and a cooling filter member stored within said side cylinder closed by said upper cover and said lower cover in order to cool the generated gas and to remove slag within the gas;

said cooling filter member being a cylindrical member which creates a predetermined space between an outer peripheral face thereof and an inner peripheral face of said side cylinder, the upper end thereof abutting on said upper cover and the lower end thereof abutting on the inner peripheral face of said side cylinder and having a first thick wall portion which allows said cooling filter member to be press fitted within said side cylinder.

9. The gas generator for air bags as described in claim 8, wherein said cooling filter member is a molded body of crimped metallic wires or of knitted metallic mesh.

10. The gas generator for air bags as described in claim 8, wherein a second thick wall portion which abuts on the outer peripheral face of said cooling filter member is formed on the inner peripheral face of said side cylinder near said upper cover.

11. The gas generator for air bags as described in claim 8, wherein said lower cover is provided with a stepped portion at the edge and inside thereof and the lower end of said side cylinder is friction welded to the stepped portion.

12. The gas generator for air bags as described in claim 8, wherein said lower cover is friction welded to the lower end of said side cylinder and the first thick wall portion of said cooling filter member is fixed by a burr created during the friction welding.

13. The gas generator for air bags as described in claim 8, wherein a metallic cylinder having a number of holes or a mesh screen is disposed within the predetermined space created between the inner peripheral face of said side cylinder and the outer peripheral face of said cooling filter member.

* * * * *